United States Patent [19]

Herron et al.

[11] Patent Number: 5,334,300
[45] Date of Patent: Aug. 2, 1994

[54] TURBULENT FLOW ELECTRODIALYSIS CELL

[75] Inventors: John R. Herron; Edward G. Beaudry; Carl E. Jochums; Luis E. Medina, all of Corvallis, Oreg.

[73] Assignee: Osmotek, Inc., Corvallis, Oreg.

[21] Appl. No.: 986,772

[22] Filed: Dec. 8, 1992

[51] Int. Cl.$^5$ .............. C25B 9/00; C25C 7/00; C25C 7/02
[52] U.S. Cl. .................... 204/257; 204/252; 204/253; 204/263
[58] Field of Search ............. 204/257, 252, 253, 263

[56] References Cited

U.S. PATENT DOCUMENTS

| | | | |
|---|---|---|---|
| 2,739,938 | 3/1956 | Wiechers et al. | 204/301 |
| 2,741,595 | 4/1956 | Juda | 204/301 |
| 2,758,083 | 8/1956 | Van Hoek et al. | 204/301 |
| 2,891,900 | 6/1959 | Kollsman | 204/301 |
| 3,746,175 | 7/1973 | Markley | 210/321.64 |
| 4,146,480 | 5/1979 | Holánek et al. | 210/232 |
| 4,343,689 | 8/1982 | de Nora et al. | 204/253 |
| 4,469,577 | 9/1984 | Schmitt et al. | 204/252 |
| 4,608,144 | 8/1986 | Darwent | 204/257 |
| 4,617,101 | 10/1986 | Sato et al. | 204/252 |
| 4,787,982 | 11/1988 | Caro et al. | 210/641 |

FOREIGN PATENT DOCUMENTS 1468867  3/1989  U.S.S.R. .

*Primary Examiner*—John Niebling
*Assistant Examiner*—John S. Starsiak, Jr.
*Attorney, Agent, or Firm*—Jeffrey B. Oster

[57] ABSTRACT

There is disclosed a two-chambered electrocell comprising one or a plurality of anode chambers, a crude flow inlet and a crude flow outlet communicating with the anode chamber, one or a plurality of cathode chambers, and a catholyte outlet communicating with the cathode chamber, wherein cylindrical anodes are located in the anode chamber, wherein the anode chamber is defined by a membrane having a first side and a second side, wherein the first side of the membrane communicates with crude fluid circulating within the anode chamber, and wherein the second side of the membrane is supported by a plurality of support members, wherein a pressure of crude fluid in the anode chamber deflects the membrane between the support members toward the cathode to form a crude flow path having a constantly changing direction, and wherein the cathode chamber is defined by the second side of the membrane and the two-chambered electrocell, and the support members and a cathode are located in the cathode chamber.

5 Claims, 3 Drawing Sheets

TWO CHAMBER CELL

1

TURBULENT FLOW ELECTRODIALYSIS CELL

TECHNICAL FIELD OF THE INVENTION

The present invention relates to a two chambered electrocell, a three chambered electrocell and a multiple chambered electrodialysis cell having a crude flow configuration with a constantly changing direction to cause turbulence at a membrane surface. The crude flow configuration is caused by deflection of the membrane around a plurality of parallel support members.

BACKGROUND OF THE INVENTION

Membrane electrocells (ECs) are used primarily by the chlor-alkali industry and for sea water desalination. Commercially available devices are made in a flat configuration with stack designs similar to that of filter presses. An EC, in its simplest form, is made up of an anode, one or more membranes, and a cathode. The membrane sheets are sealed so that fluid chambers are formed in layers between the electrodes. ECs are capable of separating chemicals because the membranes contain microscopic pores which allow chemical species to diffuse from one chamber to another. Such diffusion is slow. However charged species (ions) can be pulled through the pores more quickly if an electrical field is applied between the electrodes. For example, in a two-chambered cell (one membrane), if a sodium sulfate solution is fed into an anode chamber, an electric field will cause sodium ions to move through the membrane into a cathode chamber. This migration will produce a sulfuric acid solution in the anode chamber and a sodium hydroxide solution in the cathode chamber. The efficiency of this scheme is enhanced with membranes which specifically allow ions of a specified charge to pass. Therefore, in this example, a membrane would be used which selectively passes positive ions. This would inhibit movement of hydroxide ions from the cathode chamber into the anode chamber, thus saving electrical energy.

Commercial ECs are generally either electrodialysis cells or salt-splitting cells. Electrodialysis cells are made up of a large number of membranes stacked between two electrodes. In these systems, the membranes alternate between cationic (passes cations) and anionic (passes anions) types. The chambers are filled alternately with a salt brine and a water solution to be desalted. Salts are pushed by the electric field from the water into the brine to produce a desalinated stream.

Salt-splitting cells (chlor-alkali cells) differ from electrodialysis cells primarily because their output is a base stream, an acid stream, or a generated gas instead of a purified water and a brine stream. Most salt splitting cells use only one or two membranes per cell, and large scale production is achieved by stacking many cells together.

Recent attempts to improve ECs have tried to increase turbulence. Turbulence has been increased by installing grids or "turbulence promoters." These turbulence promoters fill a gap between an electrode and a membrane so that fluid must flow around a series of obstructions. This causes a high degree of mixing which can break up boundary layers at membrane surfaces and remove bubbles which can occlude parts of the electrode. Usually the main advantage of turbulence promoters is an improvement in electrical efficiency. Potential drawbacks to turbulence promoters are that they foul easily and cause significant pressure drops. Fouling can be overcome by pretreating feed chemicals and pressure drops can be overcome by limiting the EC dimension. However, both solutions to fouling and pressure drops add considerable expense to the cost of an EC system.

One example of a cell designed to limit pressure drops while maintaining turbulence in the DEM® cell from electrocatalytic. In this cell, the electrodes are "dished out" over the active surface so that the flow path in its headers is relatively unrestricted. This avoids many of the flow distribution problems often found in narrow gap cells. Pressure drops can also be minimized in a lantern blade cell. The "lantern blade" term refers to an electrode made up of slats arranged in parallel and at an angle in a "Venetian blind" pattern. The membrane is supported by the edges of the pieces, and fluid flows in the gap in the slats.

ECs are used to produce materials which can also be obtained by other technologies. Therefore, economic considerations are of paramount concern in the design of ECs. Further, the greatest expense is electricity consumption. To minimize electrical resistance and electricity use, EC cells are usually designed with fluid compartments as thin as possible. For example, in ICI's two-chambered, lantern-blade electrocell (model FM21), the gap between electrodes is 2.5 mm. However, one drawback to narrow gap distances is that they limit fluid velocities through the EC (typically <10 cm/sec). This exaggerates fouling problems.

Fouling problems are often not a major concern in commercial salt splitting applications because the feed streams can be pretreated to minimize fouling. However, pretreatment of feed streams adds considerably to expenses. Moreover, there are uncommercialized applications for ECs where fouling prevents commercial viability. These applications include processing streams which contain either suspended particulates or large gel-forming molecules in solution. Examples of such uncommercialized applications include desalting of liquid foods, removal of lignin from black liquor in wood pulp processing and desalting of pharmaceutical process streams.

The most rapid type of fouling is a surface phenomena. During EC operation, particles or large molecules in solution can adhere to the electrode and membrane surfaces due to electrical forces or due to differences in surface energies between the fluids and the surfaces. Eventually an impermeable film is formed over the surfaces. A method of suppressing this build up is to increase the amount of turbulence in the fluid. High sheer generated by turbulence can pull foulants away from the surface before they adhere to a surface and make a firm attachment. Therefore there is a need in the art for an EC which could maximize turbulence while maintaining small electrode spacing for processing fouling fluids.

High levels of turbulence can also increase the limiting current of an EC. "Limiting current" refers to a situation where ion flux through membranes is so fast that the concentration of ions near one side of a membrane becomes depleted. When this happens, the voltage gradient in the fluid near the membrane grows so steep that water begins to split into $H^+$ and $OH^-$. Such splitting consumes electrical energy without improving cell performance. Turbulence is, therefore, beneficial because it can delay the onset of water splitting by increasing mixing in the fluids and wiping away the ion-depleted layer. Other benefits of turbulence in ECs include the fact that bubbles that form on electrodes are stripped away quickly. Also minimizing ion depletion conditions near the membrane reduces voltage drops in the cell and lowers energy consumption.

Accordingly, there is a need in the art to find an alternate solution to membrane fouling problems that can allow the use of feedstock materials having a high suspended solids content, such as black liquor in the pulp and paper industry. The present invention was made to address these issues.

SUMMARY OF THE INVENTION

The present invention provides an electrodialysis cell having a fluid flow design with high turbulence at a membrane surface by having a flow path with a continual change in flow direction. The present invention can take the form of a two chambered electrocell, a three chambered electrocell or a multiple chambered electrodialysis cell.

For a two-chambered electrocell, the present invention provides a two-chambered electrocell having one or a plurality of anode chambers and one or a plurality of cathode chambers within the electrocell, comprising: (a) an enclosed electrocell having a crude flow inlet and a crude flow outlet communicating with an anode chamber and a catholyte inlet and a catholyte outlet communicating with a cathode chamber: (b) an anode chamber within the enclosed electrocell comprising cylindrical anodes arranged in parallel within the anode chamber, wherein the anode chamber is defined by a membrane having a first side and a second side, wherein the first side of the membrane communicates with crude fluid circulating within the anode chamber, and wherein the second side of the membrane is supported by a plurality of support members arranged in parallel to each other and to the anodes, wherein a pressure of crude fluid in the anode chamber deflects the membrane between the support members toward the cathode to form a crude flow path having a constantly changing direction; and (c) a cathode chamber within the electrocell and defined by the second side of the membrane, the cathode, and the enclosed electrocell, and comprising the support members and a cathode. Preferably, the catholyte flow in a direction perpendicular to the crude flow direction.

In a three chambered configuration, the present invention provides a three-chambered electrocell having one or a plurality of anode chambers, one or a plurality of crude chambers, and one or a plurality of cathode chambers within the electrocell, comprising: (a) an enclosed electrocell having an anodelyte flow inlet and an anodelyte flow outlet communicating with the anode chamber, a crude flow inlet and a crude flow outlet communicating with the crude chamber, and a catholyte inlet and a catholyte outlet communicating with the cathode chamber; (b) an anode chamber within the electrocell defined by an anode, a plurality of anode support members arranged in parallel, and an anode membrane having a first side and a second side, wherein the first side of the anode membrane communicates with crude flow circulating within the crude chamber and the second side of the anode membrane communicates with the anode chamber and with the anode support members, wherein a greater pressure applied to the crude chamber results in the anode membrane being deflected toward the support members within the anode chamber; (c) a cathode chamber within the electrocell defined by a cathode, a plurality of cathode support members arranged in parallel to each other and to the anode support members, and a cathode membrane having a first side and a second side, wherein the first side of the cathode membrane communicates with crude flowing within the crude chamber and the second side of the cathode membrane is supported be the plurality of cathode support members, wherein a greater pressure applied to the crude chamber results in the cathode membrane being deflected toward the cathode; and (d) a crude chamber within the electrocell defined by the first side of the anode membrane and the first side of the cathode membrane, wherein the anode support members and the cathode support members are offset from each other such that a crude flow path with a constantly changing direction is formed upon application of a greater pressure to the crude chamber than to the anode chamber or the cathode chamber. Preferably, the catholyte flow in a direction perpendicular to the crude flow direction.

In an electrodialysis configuration, the present invention provides a multiple-chambered electrodialysis cell having an anode chamber, a plurality of brine chambers, a plurality of desalinate chambers, and a cathode chamber within the electrodialysis cell, comprising: (a) an enclosed electrodialysis cell having an anodelyte flow inlet and an anodelyte flow outlet communicating with the anode chamber, a plurality of brine chambers, a plurality of desalinate flow chambers, wherein each brine and desalinate flow chambers comprise an inlet and an outlet, and a cathode chamber having a catholyte inlet and a catholyte outlet; (b) an anode chamber within the electrocell having an anode, and an anode membrane wherein the anode membrane has a first side and a second side, wherein the first side of the anode membrane communicates with a fluid (anodelyte) within the anode chamber and the second side of the anode membrane communicates with a brine chamber: (c) a plurality of brine chambers, each defined by a series of support members arranged in parallel and each defined by one or two brine membranes, wherein the brine chamber adjacent to the anode chamber is defined by the second side of the anode membrane and a first side of a brine membrane, or wherein a brine chamber not adjacent to the anode chamber is defined by two brine membranes wherein the first and the second brine membranes have a first side and a second side, wherein the first sides of the brine membranes communicate with the brine chamber and the second sides of the brine membranes communicate with an adjacent desalinate flow chamber, wherein greater pressure applied to a fluid in the desalinate flow chamber or the anode chamber causes each brine membrane or anode membrane to deflect in a direction of the brine chamber, and wherein the support members of adjacent brine chambers are offset: (d) a plurality of desalinate chambers, each defined by the second side of the brine chamber membranes, wherein the desalinate chamber adjacent to the cathode chamber is defined by the second side of a brine membrane and a second side of a cathode membrane, and wherein a desalinate chamber not adjacent to the cathode chamber is defined by the second sides of brine membranes from adjacent brine chambers; and (e) a cathode chamber comprising a cathode, a series support members arranged in parallel and offset from the adjacent brine chamber, and a cathode membrane having a first side and a second side, wherein the first side of the cathode membrane communicates with the cathode chamber and the second side of the cathode membrane communicates with an adjacent desalinate flow chamber, such that greater fluid pressure applied to the adjacent desalinate flow chamber than the cathode chamber deflects the cathode membrane toward the cathode chamber support members. Preferably, the catholyte, anodelyte and brine flow in a direction parallel to each other and the desalinate flows in a direction perpendicular to the catholyte, anodelyte and brine.

DETAILED DESCRIPTION OF THE INVENTION

Figure 1:
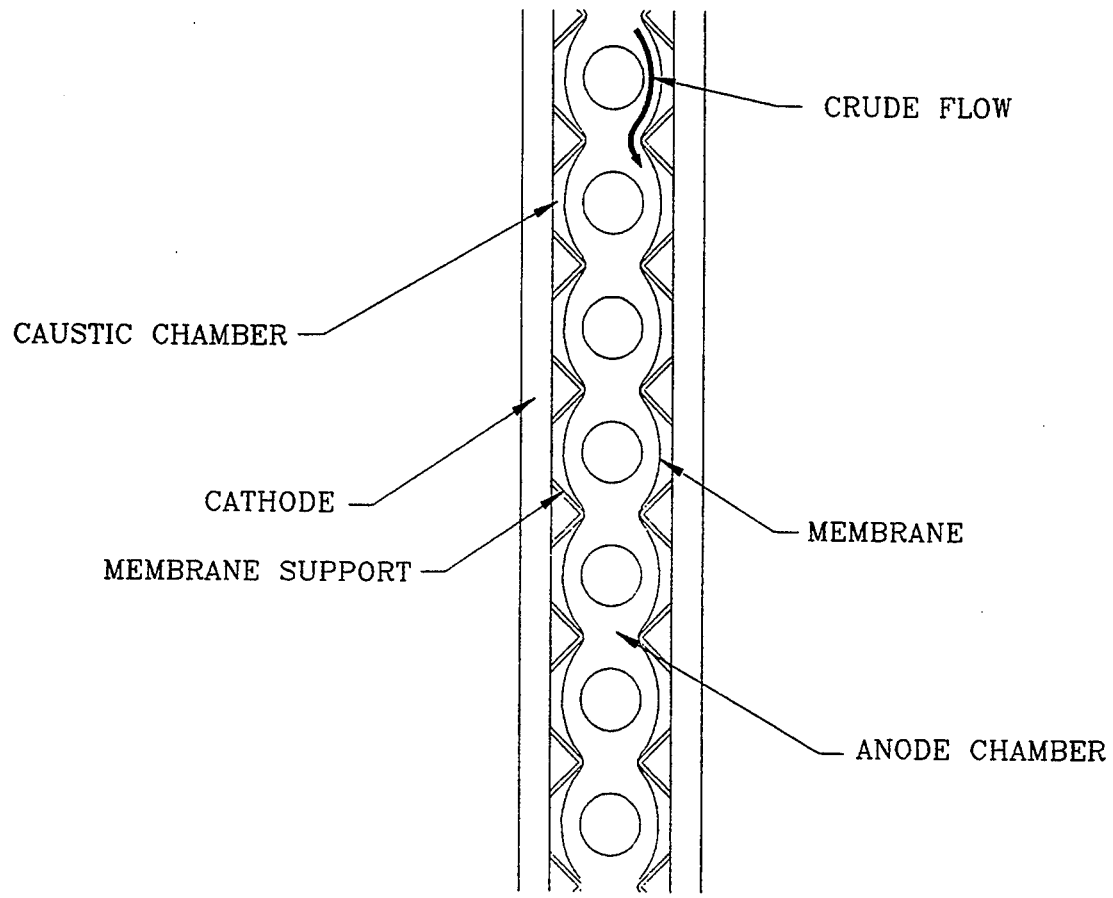
FIG. 1 shows a small portion of a cell of a two chambered electrocell wherein the anodes are 1.3 cm diameter cylindrical members (solid or hollow) located in the anode chamber, the support members are about 0.6 cm diameter rods located in the cathode chamber, the spacing between anode centers is around 2.0 cm, and the minimum gap distance between the anode and cathode is around 0.6 cm to maximize efficiency of the electrocell. The distance between support members is from 1.8 cm to 3.0 cm. The flow pattern is in a cross-flow design wherein the feedstock (i.e., "crude") flows through the gap between the cylindrical anodes and the membrane according to the thick arrow. The continually changing flow direction of the crude induces a high amount of turbulence at the first side of the membrane. The catholyte flows perpendicular to the crude (in FIG. 1, this is out of the page). Induced turbulence for the catholyte is less than the crude because the flow path is straighter.
Figure 2:
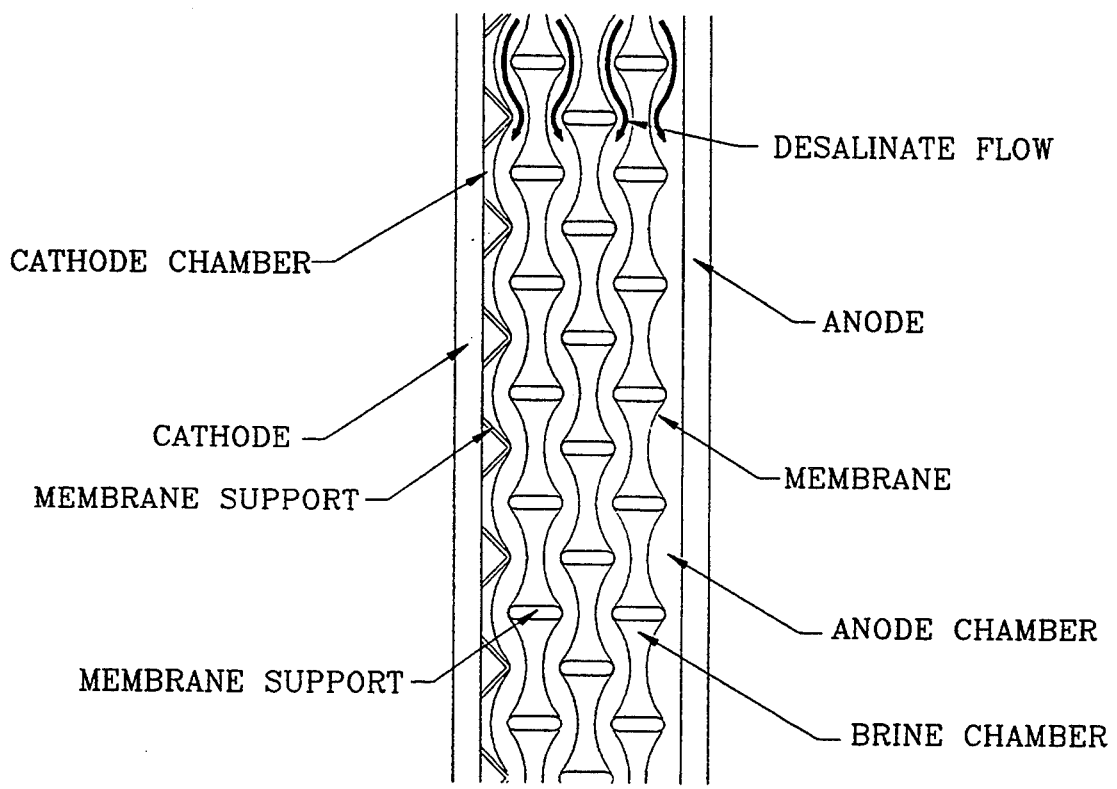
FIG. 2 shows a small portion of a three chambered electrocell having a flat structure and alternating anodes and cathodes and having cylindrical (coming into and out of the page) and offset support members that create a crude flow path with a constantly changing direction when pressure is applied to deflect each of the membranes.

The present invention provides an electrocell having a novel design for promoting high turbulence in that portion of the electrocells sensitive to fouling or limiting current problems. The inventive electrodialysis cell designs allow for electrochemical processing of fluids which would foul surfaces in conventional electrocells and allow for higher current densities in electrodialysis. Applications of the inventive electrodialysis cells include, for example, salt splitting of industrial waste to reclaim and recycle needed chemicals, adjustment of pH of chemical solutions by cation removal, production of NaOH from mineral deposits, precipitation of species from solution by cation removal, such as precipitation of lignin from black liquor by sodium removal, removal of sodium from foods, desalination of sea water, and electrosynthesis of organic molecules.

The inventive electrochemical cell enables processing of fouling streams more easily than other electrocells due to its unique geometry. In all three electrocell configurations, the membranes (e.g., anode membrane, brine membranes and cathode membranes) are intentionally allowed to deflect in response to fluid pressure differentials so that a flow path with a constantly changing direction is formed. Such changes in direction create high degrees of turbulence due to inertial effects. Instilling turbulence by virtue of a constantly changing direction is preferable to using turbulence promoters because no grid is placed within the flow path. A grid, by nature, will create numerous pockets of stagnant flow which will foul. Another advantage of directionally-induced turbulence of the present invention, is that fluid shear is concentrated at membrane surfaces where it is most beneficial. This reduces pressure drops through the cell in comparison with cells with turbulence promoters.

Two-Chambered Electrocell

In the two-chambered configuration, the cathodes are made from plates of stainless steel or another suitable material that is electrically conductive and non-corrosible. Cathodes may be laminated with a more electrically conductive material in their center to improve power distribution characteristics. Anodes are preferably cylindrical and may be hollow or solid. A conductive core of a material different than the anode surface may be used to improve power distribution. Anode diameter sizes in a cylindrical configuration range from about 0.5 cm to about 5 cm.

The membranes in the two chambered configuration are semipermeable membranes and are supported by a plurality of support members arranged in parallel within a cathode chamber. A higher fluid pressure applied to the fluid in the crude chamber will cause the membrane to deflect toward the cathode, forming a membrane geometry which, in cross section, resembles that made by support cables of a suspension bridge. Preferably, the support members are made from a non-corrosive substance. such as a rigid polymer, and the surfaces of the support members in contact with the membrane should be smooth and rounded to avoid physical damage to the membrane. The distance between support members should be greater than the diameter of the anode but less than the anode diameter plus 3 cm. That portion of the support member in contact with the membrane, when the support member is in a rod or elongated rod-like configuration, should be between one-fourth and three-fourths the anode diameter from the cathode surface.

The anode chamber is shown in cross section in FIG. 1. The cylindrical anodes are arranged in parallel such that the axes of the anodes forms a plane perpendicular to the page and horizontal across FIG. 1. Preferably, the anodes are about 0.5 cm to about 5 cm diameter cylinders with the spacing between anode cylindrical centers from about 0.75 cm to about 5 cm, and preferably about 2 cm. Once there is pressure applied to the crude feedstock (as depicted in FIG. 1) the semipermeable membranes, supported by the supporting members in the cathode chamber, form a serpentine flow path as shown in FIG. 1. Due to the continually changing direction of the fluid flow, there is a high degree of turbulence formed along the boundary layer along the first side of the semipermeable membrane.

A crude flow path with a continually changing direction is formed by creating a cell containing two cathodes with their surfaces facing each other. The distance between cathodes should be approximately 1 cm to about 2 cm greater than the anode diameter. Membranes and membrane supports are installed such that the support members are directly opposite each other, as shown in FIG. 1, and are offset from the cylindrical anodes as seen in FIG. 1. Preferably, cylindrical anodes are fixed within the crude chamber in the center of gaps formed between membrane supports. A crude flow perpendicular to the anodes (the anodes come out of the page in FIG. 1) is induced in the crude chamber, with the result that the crude fluid must wind its way through a serpentine path defined by the membranes and the anodes.

Common Features of Each Electrocell Configuration

The semipermeable membrane must sag to achieve a continually changing flow path for the crude. The semipermeable membrane is allowed to deflect up to a predetermined distance beyond the supporting member. Desired membrane deflection is caused when a sufficient amount of transmembrane pressure of from about 1.0 psig to about 25 psig is applied to the fluids (i.e., crude and catholyte) on both sides of the membrane.

The high amount of turbulence at the first side of the semipermeable membrane helps to prevent surface fouling at the first side of the membrane. Surface fouling and internal membrane fouling both degrade performance of electrodialysis cells. Internal fouling is usually a result of an equilibrium driven chemical precipitation in the semipermeable membrane pores. Such precipitation is particularly serious because it leads to irreversible stretching of pores within the membrane and permanently degraded current efficiencies. Such precipitation could occur because of changes in pH as cations are drawn from an acidic crude to the basic catholyte. In order to minimize this problem, it is important to moderate the pH of the catholyte and to keep the flow rate of the catholyte high enough to avoid concentration polarization at the second side of the membrane, or to perform the electrolytic process at lower current densities, or maximize membrane area, and/or increase fluid temperatures to surpass equilibrium point. For some forms of precipitation, particularly sulfate precipitation, the presence of an electrical field inhibits precipitation. To take advantage of this phenomena, the electrodialysis cell must be designed to avoid regions of low field strength in the membranes.

An advantage of the inventive electrocell designs is that it is not as sensitive to drying induced rupture as conventional designs due to a high amount of slack in each membrane in each of the three electrocell and electrodialysis cell designs. During drying, membranes tend to shrink, and in conventional cells, this can lead to membrane rupture. In view of the fact that the membrane in the inventive electrochemical cells are not stretched taught, shrinking can be accommodated by decreased deflection between the support members.

Conventional electrochemical or chlor-alkali cells operate with fluids containing 1500 to 300,000 mg/L dissolved solids and must be virtually free of suspended solids (no more than 1.0 NTU turbidity). Therefore, conventional electrochemical and chlor-alkali cells will have their feed streams pretreated with filtration equipment, ion exchange resin, sequestion agents to keep salts in solution, and/or with acid addition for pH control in order to eliminate salt precipitation within the EC. This eliminates possible deposition of suspended solids on the surface of the membrane. The inventive cells have a turbulent flow design with a continually changing flow direction while maximizing membrane contact time as the fluid comes into direct contact with the deflected semipermeable membrane in the "serpentine" fluid path. This turbulence in inventive ECs maintains a stirring effect which maintains suspended particles in solution and reduces the amount of settling material on the membrane surface to minimize fouling. Moreover, pretreatment procedures are generally unnecessary with the inventive EC, thus saving operating and capital costs.

The limiting electrical current allowed in an EC is inversely proportional to the thickness of the unstirred boundary layer on the first side of the membrane. Increased turbulence afforded by the design of the inventive ECs allows electrodialysis operations at higher currents than conventional electrocells or chlor-alkali cells. Higher limiting current densities are a result of higher rates of mass transfer within the anode chamber and because the turbulence of the inventive flow path design provides a thinner or no unmixed laminar boundary layer on the first side of the membrane. Therefore, inventive ECs may be operated at higher current densities than conventional ECs or chlor-alkali cells. For example, in water desalination procedures with conventional ECs or chlor-alkali cells, the operating current is usually kept just below the limiting current density of the cell instead of at a more economically favorable higher current density. The inventive EC can perform water desalination procedures at higher current densities to desalinate water more economically. This also reduces capital and operating costs for equipment and for a procedure utilizing the inventive electrocells and electrodialysis cells. Most importantly, with the present inventive design, smaller electrocells would be needed that could significantly reduce capital costs.

As current density is increased toward its limiting current, voltage potential increases up to a point where water may split into hydrogen and hydroxyl ions. The hydroxyl ions can form precipitates with calcium, magnesium or other cations and foul the membrane first surface. In the inventive EC designs, water splitting can occur only at higher current densities because the limiting current is higher. This advantage of the inventive cell designs allow for water desalination operations of cells at higher current densities with less salt precipitation problems. This reduces capital costs of the equipment. Further, voltage drops are lower for the inventive cell than for conventional cells when compared with water desalination operations at similar current densities and when operating near each cell's limiting current. This reduces operating costs for the inventive EC.

In any of the inventive electrocell configurations, the cathodes are made from plates of stainless steel or another suitable, noncorrosive material. Cathodes may also be laminated with a more conductive material to improve power distribution characteristics. Anodes are preferably cylindrical in design in the two-chambered electrocell and in a plate shape in the three-chambered electrocell and the electrodialysis cell, and may be hollow or solid. A conductive core of the anode made from a material different than the material comprising the anode surface may be used to improve power distribution. Anode diameters in a cylindrical configuration range from about 0.5 cm to about 5.0 cm.

Since the catholyte is a non-fouling fluid, it is not necessary to install a catholyte flow path with a continuously changing direction in the cathode chamber in any of the three inventive configurations. Catholyte flow is, preferably, parallel to the support members through channels defined by the cathode, the support members and the membrane in any of the three inventive configurations.

In the two-chambered electrocell, the three-chambered electrocell and the electrodialysis cell, the membranes are semipermeable membranes of a monofilm or a bifilm design. Preferably, the semipermeable membrane is relatively thin (e.g., from about 1 mil to about 10 mils). Suitable membranes include, for example, Nafion ® membranes from the 100, 400 and 900 series, Desal #N100, and RAI-Pall #R1030. In selecting a semipermeable membrane, it is important to consider if the membrane is pliable enough to be deflected by fluid pressure differences and to be able to conform to a path around rounded support members.

Three-Chambered Electrocell

In a three-chambered electrocell (e.g., salt-splitting cell), the potentially fouling feedstock is introduced into a crude chamber in the electrocell between the anode and cathode chambers. In this configuration, the electrodes (i.e., anodes and cathodes) are preferably flat and made from appropriate conductive and non-corrosive materials (e.g., stainless steel, precious metal oxide coated titanium) and they may be laminated with more conductive materials to improve power distribution. Membrane support members are installed in both the anode chamber and the cathode chamber. The support members are similar to the support members in the two-chambered electrocell, and preferably rod shaped. The support members in the anode and cathode chambers are offset from each other, such that when the crude chamber is pressurized, a flow path with a continually changing direction is formed within the crude chamber. Preferably, the electrodes are from about 0.5 cm to about 2.0 cm apart and the support members (diameter or similar distance) span about one half of the electrode gap. Spacing between support members (i.e., the distance between outer walls of support members) is from about 1 cm to about 3 cm. The semipermeable membranes are subject to the same constraints as in the two-chambered electrocell configuration, however, the membrane communicating with the cathode chamber is preferably of the cationic type while the membrane communicating with the anode chamber is preferably of the neutral or anionic type.

Electrodialysis Cell

Figure 3:
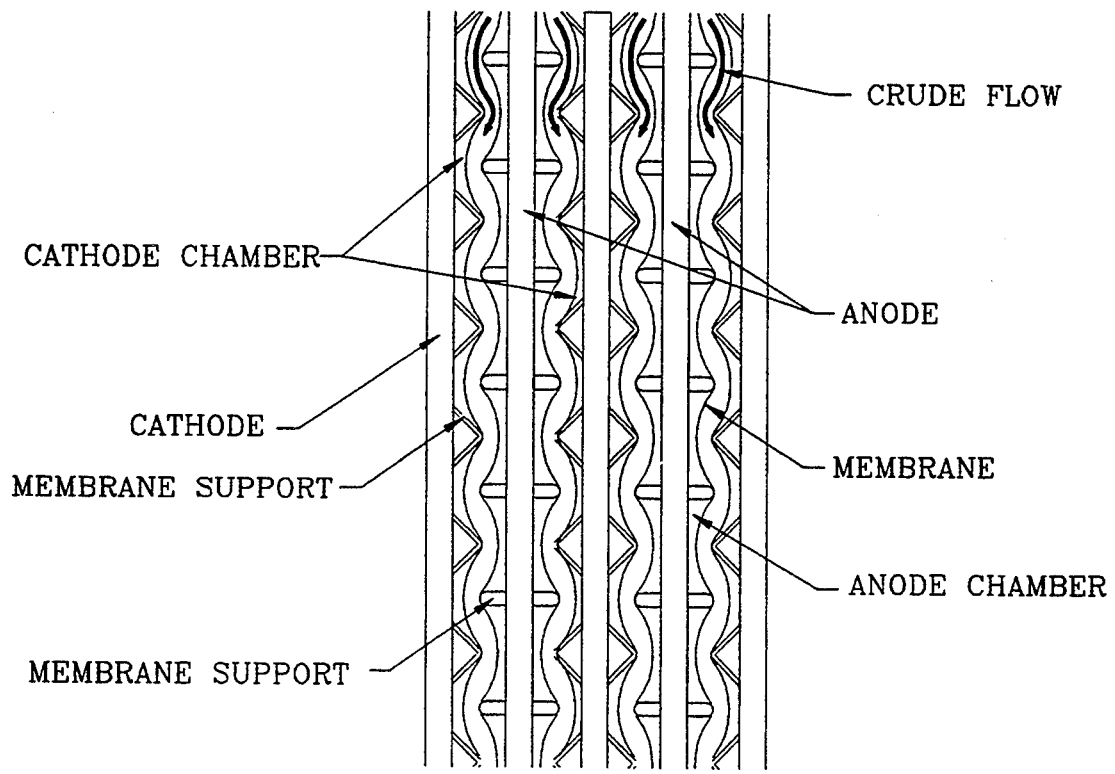
FIG. 3 shows an a small portion of a multiple chambered electrodialysis cell having a flat anode, an adjacent anode chamber, a plurality of brine chambers, each having a series of parallel support members in an oblong shape with rounded faces in contact with each membrane surface and that are offset in adjacent brine chambers, a plurality of desalinate flow chambers that show a constantly changing direction for fluid flow that is formed when pressure is applied to deflect each membrane around the support members, and a cathode chamber having a flat cathode and a series of cylindrical and parallel support members that are offset from the support members in an adjacent brine chamber.

In the electrodialysis cell configuration, the desalinate fluid (fluid to be desalted) flows through a plurality of desalinate flow chambers located parallel to and between an anode chamber and a cathode chamber. The flow path in the desalinate flow chambers is of the same configuration (i.e., continually changing flow direction) as the crude chamber of the three-chambered electrocell. Between each of the desalinate flow chambers is a brine chamber comprising the deflected membranes and support members (see, for example, FIG. 3). Preferably, brine flows parallel to the support members (i.e., into and out of the page in FIG. 3) and perpendicular to the desalinate flow.

Preferably, in the electrodialysis cell, the membranes in the cell alternate between cationic and anionic (or neutral) types. As a result, current passing through the cell will be carried by cations through the cationic membrane, and carried by anions traveling in the opposite direction through an anionic (or neutral) membrane. Since the membrane types are preferably installed in an alternating pattern, this will cause ions to leave the desalinate fluid and become concentrated in the brine chambers. It is important to instill turbulence in the desalinate chambers because ion depletion can lead to low limiting currents, accordingly, in the multiple chambered electrodialysis cell design, the desalinate flow chamber is designed with a continually changing flow direction. The flow path in the brine chambers does not induce turbulence, however, the ion concentration in the brine is high enough that limiting currents on the brine side of the membranes are not approached.

It should be noted that in a preferred electrodialysis cell configuration, the salt solution in the anode and cathode chambers does not mix with either the brine or desalinate fluids. The anodelyte and catholyte comes from a common reservoir, and after passing through the electrodialysis cell, are recombined. This maintains a constant salt concentration in the fluid.

What is claimed is:

1. A two-chambered electrocell comprising one or a plurality of anode chambers, a crude flow inlet and a crude flow outlet communicating with the anode chamber, one or a plurality of cathode chambers, and a catholyte outlet communicating with the cathode chamber, wherein cylindrical anodes are located in the anode chamber, wherein the anode chamber is defined by a membrane having a first side and a second side, wherein the first side of the membrane communicates with crude fluid circulating within the anode chamber, and wherein the second side of the membrane is supported by a plurality of support members, wherein a pressure of crude fluid in the anode chamber deflects the membrane between the support members toward the cathode to form a crude flow path having a constantly changing direction, and wherein the cathode chamber is defined by the second side of the membrane and the two-chambered electrocell, and the support members and a cathode are located in the cathode chamber.

2. The two-chambered electrocell of claim 1, wherein the catholyte flows in a direction perpendicular to the crude flow direction.

3. The two-chambered electrocell of claim 1 wherein the support members have a center-to-center spacing greater than the diameter of the anode but less than the anode diameter plus 2 cm.

4. A three-chambered electrocell comprising one or a plurality of anode chambers having an anolyte flow inlet and an anolyte flow outlet communicating with the anode chamber, one or a plurality of crude chambers having a crude flow inlet and a crude flow outlet communicating with the crude chamber, and one or a plurality of cathode chambers, wherein an anode and a plurality of anode support members are located in the anode chamber, wherein the anode chamber is defined by an anode membrane having a first side and a second side, wherein the first side of the anode membrane communicates with crude flow circulating within the crude chamber and the second side of the anode membrane communicates with the anode chamber and with the anode support members, wherein a greater pressure applied to the crude chamber results in the anode membrane being deflected toward the anode support members, wherein a cathode and a plurality of cathode support members are located in the cathode chamber, and the cathode chamber is defined by a cathode membrane having a first side and a second side, wherein the first side of the cathode membrane communicates with crude flowing within the crude chamber and the second side of the cathode membrane is supported be the plurality of cathode support members, wherein a greater pressure applied to the crude chamber results in the cathode membrane being deflected toward the cathode, and wherein the crude chamber is defined by the first side of the anode membrane and the first side of the cathode membrane, wherein the anode support members and the cathode support members are offset from each other such that a crude flow path with a constantly changing direction is formed upon application of a greater pressure to the crude chamber than to the anode chamber or the cathode chamber.

5. The three chambered electrocell of claim 4, wherein the catholyte flows in a direction perpendicular to the crude flow direction.

* * * * *